United States Patent
Lin et al.

(10) Patent No.: US 7,215,380 B2
(45) Date of Patent: May 8, 2007

(54) METHOD FOR DETECTING VIDEO FRAME TYPES WITH MEDIAN FILTERING

(75) Inventors: Wen-Kuo Lin, Taipei (TW); Jong-Ho Yan, Shinying (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 551 days.

(21) Appl. No.: 10/413,308

(22) Filed: Apr. 15, 2003

(65) Prior Publication Data

US 2004/0207752 A1    Oct. 21, 2004

(51) Int. Cl.
*H04N 5/08* (2006.01)
(52) U.S. Cl. .................. 348/526; 348/449; 348/558
(58) Field of Classification Search ........ 348/448–449, 348/526–527, 556–558, 700, 701, 665–670; *H04N 5/08*
See application file for complete search history.

(56) References Cited

U.S. PATENT DOCUMENTS 6,160,589 A * 12/2000 Sadowski ............... 348/526
6,545,725 B1 * 4/2003 Fujita et al. ............ 348/604
6,700,622 B2 * 3/2004 Adams et al. ........... 348/448
6,992,727 B2 * 1/2006 Lin et al. ................ 348/526

FOREIGN PATENT DOCUMENTS

WO    03/017676 A2    2/2003

* cited by examiner

*Primary Examiner*—Trang Tran
(74) *Attorney, Agent, or Firm*—Troxell Law Office, PLLC

(57) ABSTRACT

The invention relates to a method for detecting video frame types with median filtering, which proceeds a denoising step after calculating the comb factor of each pixel, to avoid incorrect judgment of the frame type resulting from excessive field difference and improve detection accuracy.

7 Claims, 5 Drawing Sheets

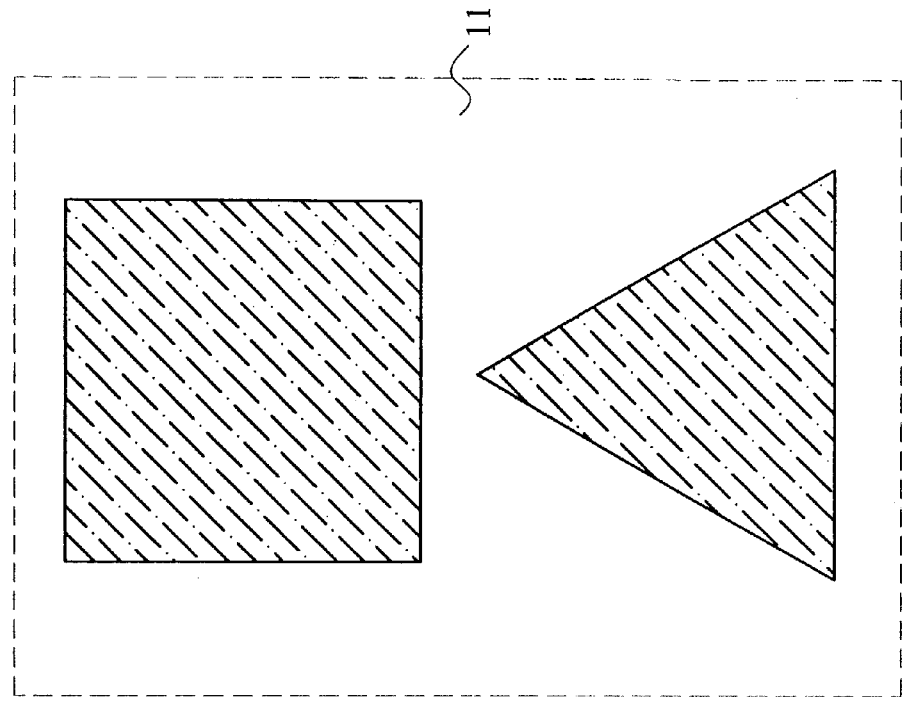
FIG. 1 (b) Prior Art,
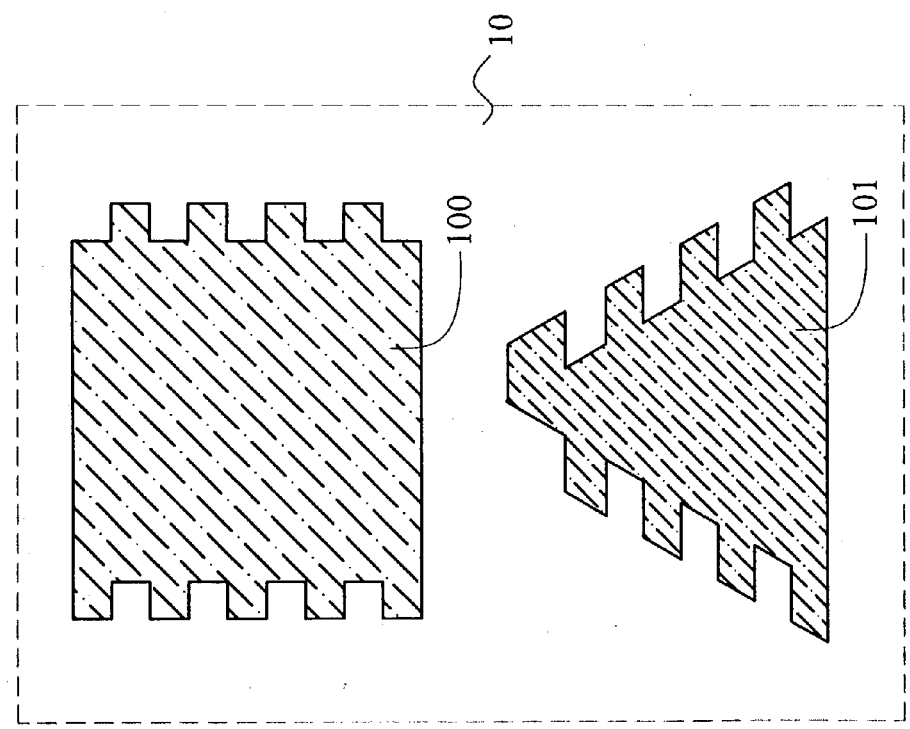
FIG. 1 (a) Prior Art,

METHOD FOR DETECTING VIDEO FRAME TYPES WITH MEDIAN FILTERING

BACKGROUND OF THE INVENTION

1. Field of the Invention

The method for detecting video frame types with Median Filtering denoising step to distinguish comb factor from impure spots, then to determine frame types and improve detection accuracy.

2. Description of the Prior Art

The video picture that is commonly adopted at present is transmitted at 30 frames per second to produce continuous and dynamic images. Each frame consists of a plurality of scan lines (for instance, National Television System Committee—NTSC, standard is 525 scan lines). That is, 525 scan lines are transmitted in 1/30 second for one frame.

Said video frame is classified into two categories: interlaced frame and progressive frame. Scanning of the interlaced frame divides each frame into a top field and a bottom-field. The top field has an odd number of scan lines while the bottom-field has an odd number of scan lines. They are separately scanned at two times. For instance, the top-field is scanned first, then the-bottom field is scanned to generate a complete frame. For the progressive frames, all of the scanning lines are transmitted at the same time, so they are scanned consequentially individually one after one.

Referring to FIG. 1(a) and 1(b) for an interlaced frame 10 and a progressive frame 11. As the interlaced frame 10 is scanned at different times and is transmitted respectively for the top field (even number of scan lines) and the bottom-field (odd number of scan lines), a comb-shaped pattern is generated on the peripheral edges of the square picture 100 and the triangle picture 101 (generally called comb factor). The resolution is less desirable and video quality is poorer. While the whole progressive frame 11 is transmitted at the same time, therefore the comb factor as shown in FIG. 1(a) does not occur.

Based on previous discussion, it is obvious that the comb factor has great impact on resolution. Hence prior to video output, a detection process is performed to determine whether the input frame is an interlaced frame or a progressive frame. If the interlaced frame is detected, then a deinterlacing process is conducted to remove the comb factor to obtain a higher quality video. If the progressive frame is detected, the video may be directly output without deinterlacing.

Referring to FIG. 2 for a traditional detection process. First, in step 201, set the comb factor counter to be zero and input a frame F (n) for calculating the comb factor of pixels; then, in step 202, apply all of the pixels to the frame function F (n); in step 203, calculate the comb factor of the pixels (the equation for calculating the comb factor will be discussed later); in step 204, determine whether the comb factor is above the threshold value; if "yes", come to step 205 and increase the counter value by one; if "no", come to step 206 to determine if it is the last comb factor; if it is, come to step 207; if "no", repeat step 203 to step 206; in step 207, determine whether the value in the counter is less than the threshold value; if yes, the frame is determined as a progressive frame at step 208; if no (i.e. the counter value is more than the threshold value), come to step 209 and determine the frame as an interlaced frame; finally end the detection process.

FIG. 3 illustrates the calculation of a pixel comb factor in step 203 shown in FIG. 2. The pixel 30 to be calculated is located on the coordinate X in the picture. O-31 indicates a first adjacent pixel (b) and O-32 indicates a second adjacent pixel (e), then the equation for calculating the comb factor of the pixel 30 is as follows:

$$\text{Comb Factor } (x, y) = (b-x) \times (e-x) - (b-e)^2 \quad \text{(Eq. 1)}$$

Of which, x is the pixel value of pixel 30 on the coordinate (x, y); b is the pixel value of the first adjacent pixel 31 on coordinate (x, y−1); e is the pixel value of the second adjacent pixel 32 on coordinate (x, y+1).

Though a pixel could be determined whether it is a comb factor by comparing the value of each comb factor figured out with the formula with a fixed threshold value, then the type of the frame could be determined by the number of the comb factors (the number of the counters), this method sometimes still leads to wrong judgments. The reason is that when a pixel is greatly different from surrounding pixels in brightness, the comb factor value calculated with above formula shall be very big, so if there are some impure spots on videos, they may be wrongly determined to be comb factors due to the difference in brightness. For instance, if there are more impure spots on progressive frame videos, they may be wrongly determine to be interlaced frames.

To solve the above mentioned problems, a method for detecting frame types with Median Filtering is offered in this invention, thus a more precise way of judging interlaced frames and progressive frames is available.

SUMMARY OF THE INVENTION

The primary object of the invention is to provide a method for detecting video frame types with a denoising step to distinguish comb factor from impure spots, then to determine frame types. Thus the number of comb factors is accurately calculated and the possibility of wrong judgment is reduced to enhance the precision of frame type judgment.

In order to achieve the foregoing object, invention for detecting frame types with Median Filtering is as follows: first, input a frame function F (n) and set the counter to zero; then apply all pixels to the function to determine whether the pixel is a comb factor; next, determine whether the comb factor is an impure spot by denoising; if it is, increasing the counter by 1; finally determine whether the frame is an interlaced frame or a progressive frames based on the number of the counter.

BRIEF DESCRIPTION OF THE DRAWINGS

FIG. 1(a) is a schematic picture of the video output of an interlaced frame;

FIG. 1(b) is a schematic picture of the video output of a progressive frame;

DESCRIPTION OF THE PREFERRED EMBODIMENT

Figure 2:
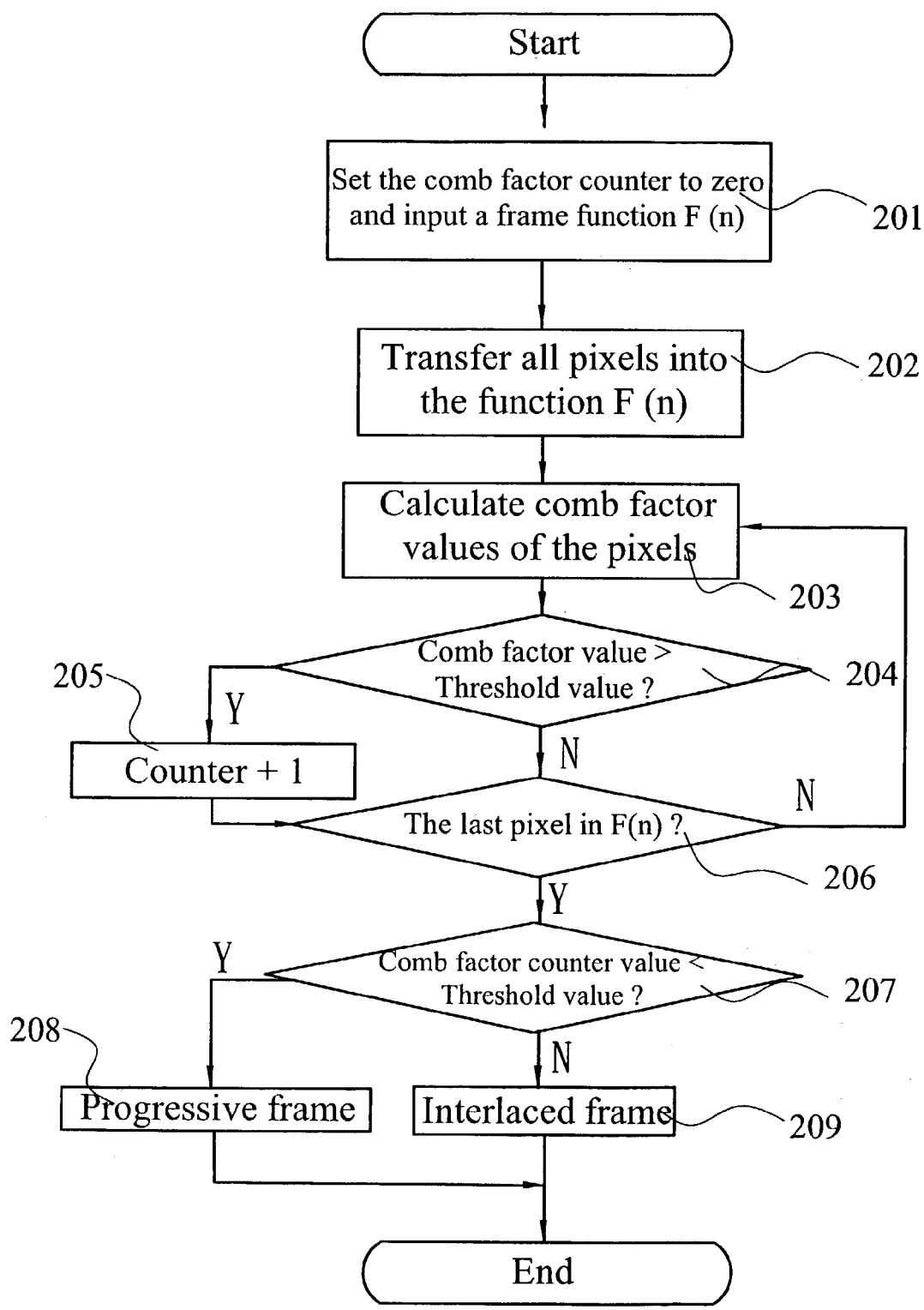
FIG. 2 is a process flow for detecting frame types adopting a traditional detection technique.
Figure 3:
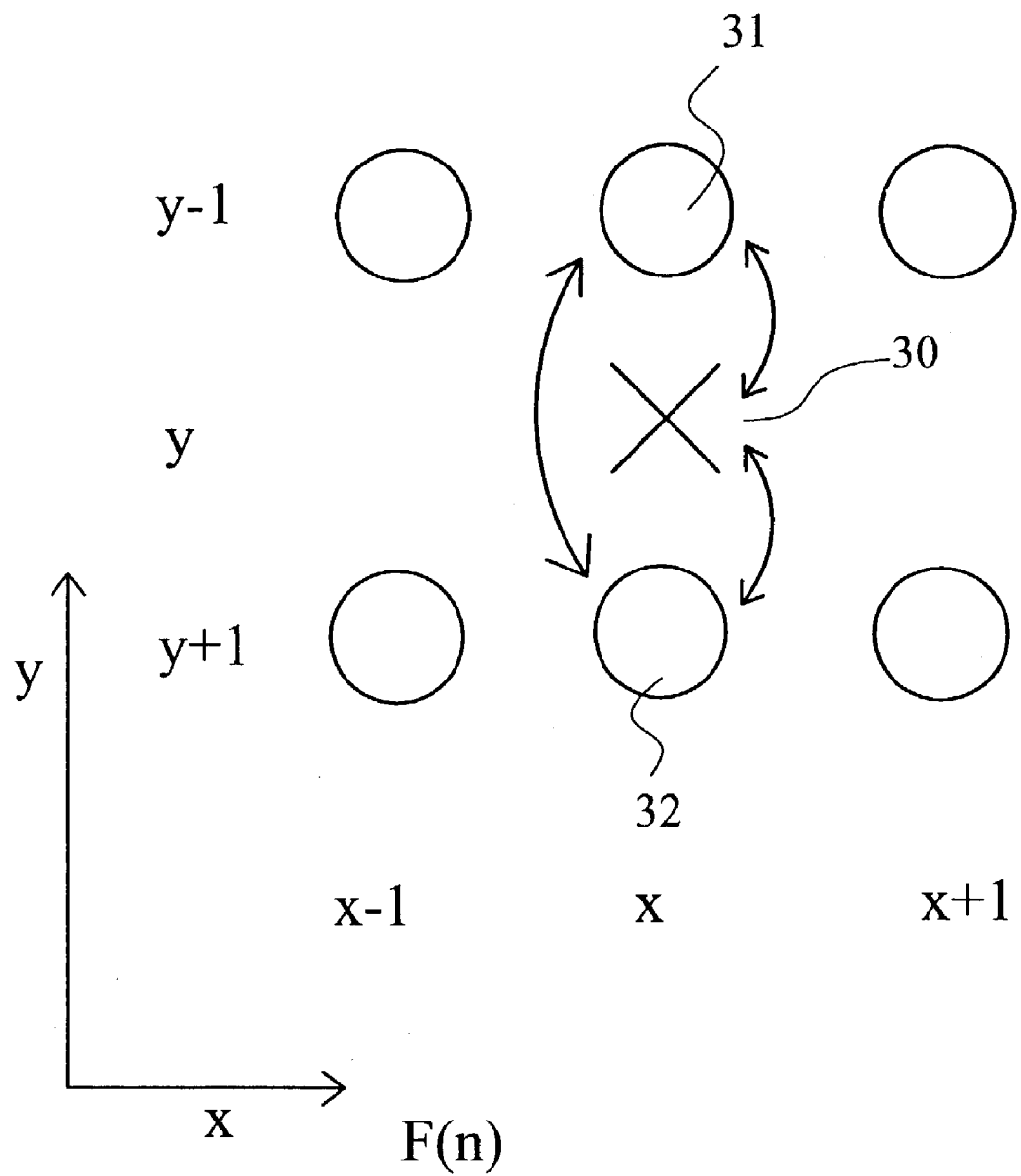
FIG. 3 is a schematic picture for calculating the comb factor value of a pixel of a frame.
Figure 4:
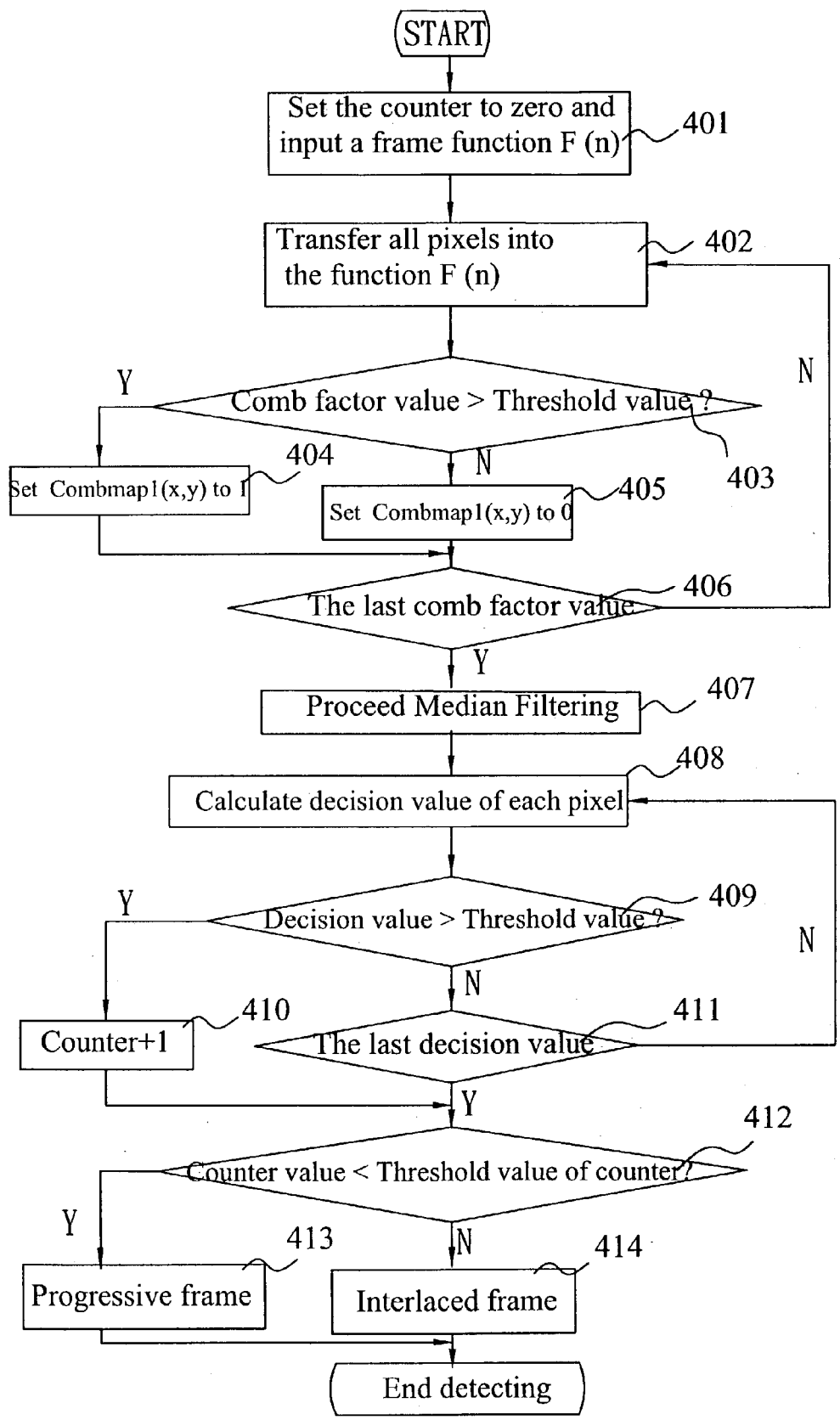
FIG. 4 is a process flow of a embodiment of the invention for detecting frame types with Median Filtering.

FIG. 4 is a process flow of a embodiment of the invention for detecting frame types with Median Filtering, comprising following steps:

First, come to step 401 to set the counter to be zero, and input a frame function F (n) in a processor, these processes are substantially same as the ones of the conventional method set forth above, thus details are omitted.

Then in step 402, applying all pixels to function F (n), and get the comb factor value.

proceeding step 403, determining whether the comb factor value is more than the threshold value.

Proceeding step 404 if the comb factor value is more than the threshold value,then set the value of Combmap1 (x,y) to be 1.

Proceeding step 405 if the comb factor value is not more than the threshold value, and set the value of Combmap1 (x,y) to be zero.

Proceeding step 406 to determine whether it is the comb map value of the last pixel.

Coming to step 407, if it is the comb map value of the last pixel.

Repeating step 402 to 405 if it is not the comb map value of the last pixel, and until the comb map value of the last pixel is figured out.

Then, come to step 407 for Median Filtering, that is, each pixel of combmap1 is applied the following formula in step 408 to get the count. The formula is shown as follows:

$$\text{Counts} = \sum_{i=-1}^{1} \sum_{j=-1}^{1} M(i, j) \cdot combmap(x+i, y+j) \quad \text{(Eq. 2)}$$

The expansion of Eq. 2 becomes $$counts = \begin{bmatrix} 1 & 1 & 1 \\ 1 & 1 & 1 \\ 1 & 1 & 1 \end{bmatrix} \cdot \begin{bmatrix} CombMap(x-1, y+1) & CombMap(x, y+1) & CombMap(x+1, y+1) \\ CombMap(x-1, y) & CombMap(x, y) & CombMap(x+1, y) \\ CombMap(x-1, y-1) & CombMap(x, y-1) & CombMap(x+1, y-1) \end{bmatrix} \quad \text{(Eq. 3)}$$

wherein, M and Combmap(x+i,y+j) are both 3×3 matrixes, and Combmap(x+i,y+j) is the comb map value of each pixel calculated before.

After the counts is figured out, it is compared with Majority-th in step 409. If it is more than the Majority-th, come to step 410 to add 1 to the counter; otherwise, come to step 411 to determine whether it is the counts of the last pixel, if it is, come to step 412; if not, repeat step 408 to 409.

In step 412, determine whether the counter value is less than the counter threshold value. The counter value represents the number of comb factors. If it is less than the counter threshold value, it means the number of comb factors does not meet the standard of an interlaced frame, and it shall be determined as a progressive frame in step 412; if it is more than the counter threshold value, it means the number of comb factors has exceeded the standard value of an progressive frame, and it shall be determined as an interlaced frame in step 413. Finally the detection flow ends.

Figure 5:
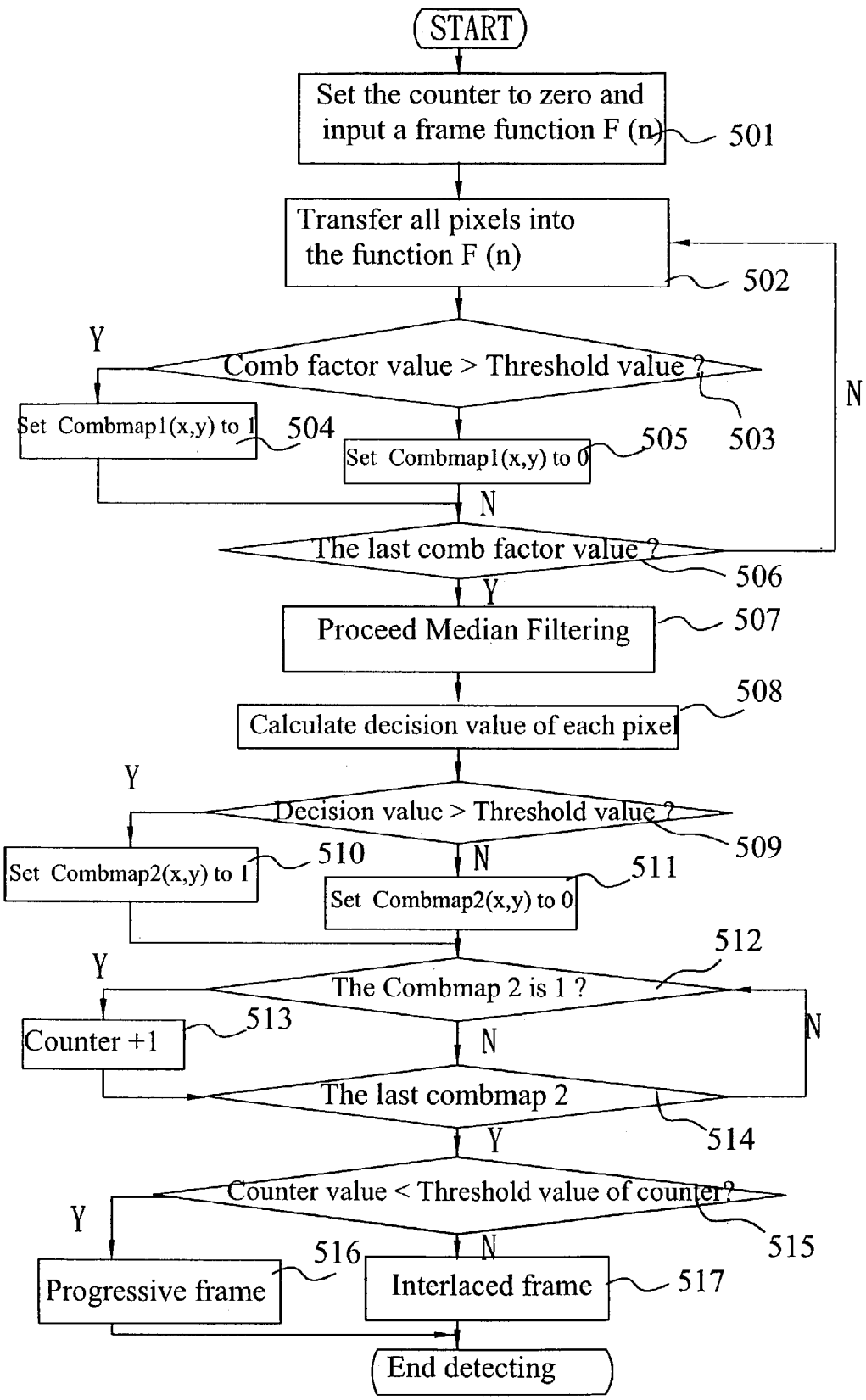
FIG. 5 is a process flow of another embodiment of the invention for detecting frames type with Median Filtering.

FIG. 5 is a process flow of another embodiment of this invention for detecting frame types with Median Filtering. It is different from the above case, i.e. it compares the counters with the Majority-th, and then inputs the result into the Compmap2. The case contains following steps: First,proceeding step 501 to set the counter to be zero and input a frame function F (n) into a processor, these processes are substantially same as the ones of the conventional method set forth above, thus details are omitted.

Then come step 502 to apply all pixels to the function F (n) and get the comb factor value.

proceeding step 503, determining whether the comb factor value of pixel f(x,y) is more than the threshold value.

Proceeding step 504 if the comb factor value is more than the threshold value,and set the value of Combmap1(x,y) to be 1.

Proceeding step 505 if the comb factor value is not more than the threshold value, and set the value of Compmap1 (x,y) to be zero.

Proceeding step 506 to determine whether it is the comb map value of the last pixel.

Coming to step 507, if it is the comb map value of the last pixel.

Repeating step 502 to 505 if it is not the comb map value of the last pixel, and until the comb map of the last pixel is figured out.

Then come to step 507 for Median Filtering. First, in step 408, each pixel of Combmap1 is applied the formulas shown in Eq. 2 to get the counts.

After calculating the counts, compare the counts with Majority-th in step 509 and input the result into factor map 2 that is a bit. In this step, the counts figured out by the formulas in Eq 3 are used to determine whether the pixel is a comb factor or an impure spot. In this case, if the counts of the pixel is more than the Majority-th, come to step 510 to set the value of Combmap2 (x,y) to be 1; whease if the counts is less than the Majority-th, come to step 511 to set the value of Combmap2 to be zero.

In step 512, determine whether Combmap2 is 1; if it is, add 1 to the counter; if not, come to step 514 to determine whether it is the last value of compmap2; if it is, come to step 515; if not, return to step 512. Step 515 is used to determine whether the counter value is less than the counter threshold value. The number of counters represents the number of comb factor. If the counter number is less than counter threshold value, it means that the number of comb factors does not meet the standard of an interlaced frame, and it is shall be determined as a progressive frame (step 516). If the counter value is more than the counter threshold value, it means the number of comb factors in this frame has exceeded the standard, and it shall be determined as an interlaced frame (step 517), finally the detection flow ends.

The detailed explanation discussed above is the method for detecting video frame types with Median Filtering. After a comb factor is figured out, the corresponding pixel is determined whether being a comb factor or an impure spot, and then the frame type is determined. In this way, the number of comb factors in a frame is accurately calculate, therefore, the possibility of wrong detection is reduced and the precision of the detection is enhanced.

All in all, this invention is advanced both in objective and in effect and is valuable in commercialization. It is unprecedented for the moment and perfectly agrees to patent requirements, thus we submit an application.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

What is claimed is:

1. A method for detecting video frame types with median filtering by denoising to distinguish comb factor from impure spots, comprising steps of:
    inputting pixels in a frame into a processor in order;
    calculating comb factor values of the pixels in the frame with a function;
    proceeding median filtering step to determine the comb factor value of each pixel by denoising to distinguish comb factor from impure spots;
    adding 1 to a counter if the pixel is a comb factor;
    keeping the counter unchanged if the pixel is not the comb factor;
    determining frame types according to the counter value and counter threshold value;
    either transmitting the pixels directly to a video output if the frame type is determined to be a progressive frame type or applying an interlacing process to the pixels prior to transmitting to the video output if the frame type is determined to be interlaced;
    displaying the pixels on a video display; and.

2. The method for detecting frame types with median filtering according to claim 1, wherein the step of median filtering includes:
    comparing the comb factor value with the comb factor threshold value;
    setting Combmap1 at the pixel location to be 1 if it is more than the comb factor threshold value;
    setting Combmap1 at the pixel location to be zero if it is less than the comb factor threshold value, and
    calculating the counts of Combmap1 of each pixel.

3. The method for detecting frame types with median filtering according to claim 2, further comprising:
    comparing the counts with a majority threshold;
    adding 1 to the counter if it is more than the majority threshold; and
    keeping the counter unchanged if it is less than the majority threshold.

4. The method for detecting frame types with median filtering according to claim 2, further comprising:
    comparing the counts with a majority threshold;
    setting Combmap2 at the pixel location to be 1, if it is more than the majority threshold;
    setting Combmap2 at the pixel location to be zero if it is less than the majority threshold;
    determining whether each Combmap2 is 1;
    adding 1 to the counter if the Combmap2 is 1; and
    keeping the counter unchanged if the Combmap2 is not 1.

5. The method for detecting frame types with median filtering according to claim 1, wherein the step of detecting frame types with median filtering includes determining a frame type according to the counter value, the frame type being progressive frame if the counter value is smaller than the counter threshold value, the frame type being interlaced frame if the counter value is not smaller than the counter threshold value.

6. A method of detecting frame types with median filtering by denoising to distinguish comb factor from impure spots, comprising steps of:
    inputting all pixels of a frame into a processor in order;
    calculating the comb factor value of each pixel according to a function;
    calculating the value of Combmap1 of each pixel;
    calculating the counts of each pixel according to the value of the Combmap1 of each pixel, and comparing the counts with a majority threshold to denoise by distinguishing comb factor from impure spots;
    setting the corresponding Combmap2 at the pixel location to be 1 if it is more than the majority threshold;
    setting the corresponding Combmap2 at the pixel location to be zero if it is less than the majority threshold;
    determining if each Combmap2 is 1;
    adding 1 to the counter if the Combmap2 is 1;
    keeping the counter unchanged if the Combmap2 is not 1;
    determining the frame type according to the counter value and counter threshold value;
    displaying the pixels on a video display; and.

7. The method for detecting frame types with median filtering according to claim 6, wherein the steps of calculating the value of Combmap1 of each pixel, comprises the steps of:
    comparing the comb factor value with a comb factor threshold value;
    setting the value of the corresponding comb map to be 1 if it is more than the threshold value; and
    setting the corresponding value of Combmap1 to be zero if it is less than the threshold value.

* * * * *